April 7, 1925.
G. RAMSEY
SPEEDOMETER
Filed Aug. 22, 1921
1,532,548
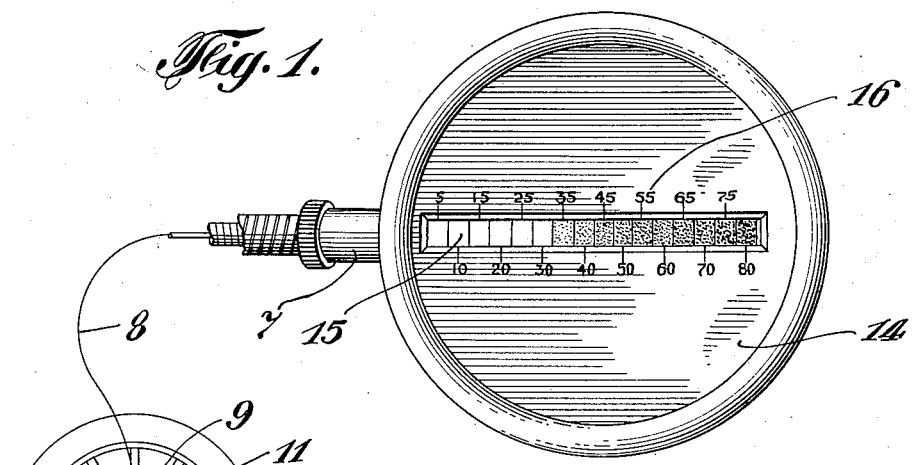
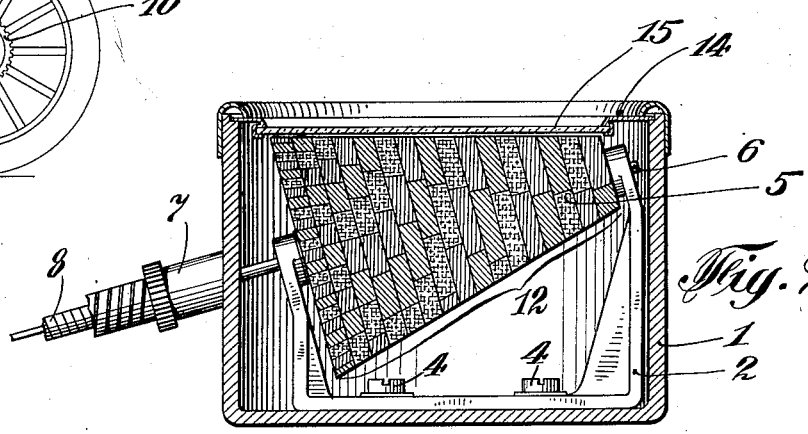
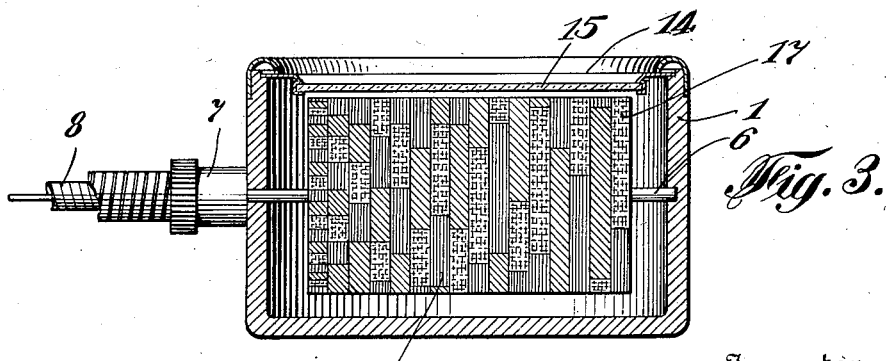
Inventor
George Ramsey Patented Apr. 7, 1925.

1,532,548

UNITED STATES PATENT OFFICE.

GEORGE RAMSEY, OF BROOKLYN, NEW YORK.

SPEEDOMETER.

Application filed August 22, 1921. Serial No. 494,052.

*To all whom it may concern:*

Be it known that I, GEORGE RAMSEY, a citizen of the United States, residing in the borough of Brooklyn, in the county of Kings, State of New York, have invented certain new and useful Improvements in Speedometers, of which the following is a specification.

The present invention relates broadly to measuring devices and more specially to a device for measuring rotative speeds.

The principal object of the present invention is a speedometer or speed measuring device wherein the speed is indicated by blending of colors due to persistence of vision.

Another object of the present invention is a speedometer wherein the speed is indicated by blending of colors due to persistence of vision, in such manner as to produce a characteristic color which advances or retards relatively to a scale as the speed of rotation is increased or decreased within predetermined limits.

A still further and important object of the present invention is a speedometer in which the speeds are indicated substantially coincident with the establishment of the speed by rotation of a member whose speed is being measured.

More specifically an object of the present invention is the production of an indication of speed by rotation of means carrying a plurality of complemental color spots graduated in such manner that as the means is rotated the color spots will progressively pass a predetermined line in varying amounts so that the blending of the colors due to persistence of vision progresses from one end of the line toward the other in such manner that the blending may be associated with a suitable scale.

Another and primary object of the present invention is the method of indicating rotative speeds which method comprises providing a member adapted to be rotated and arranging variegated color spots on the surface of said member in such manner as to produce the appearance of zones of color gradation when the member is rotated whereby the color gradation may be associated with a scale to indicate the speed of rotation.

More specifically another object of the present invention is the method of indicating the speeds by associating complemental colors in bands upon a rotating device such as a disk or drum in such manner that the blended colors may be associated with a suitable scale whereby when such device is rotated the colors blend into white in a progressive manner relatively to the scale as the speed of the device is increased or decreased.

Other and more specific objects of the present invention will in part be obvious and will in part be pointed out hereinafter in the specification following wherein like parts are indicated by like characters throughout the several figures thereof.

It is realized that the present invention may be carried out by methods which may differ from those herein described and in constructions other than those herein specifically shown and explained so therefore it is desired that the disclosure herewith shall be considered as illustrative and not in the limiting sense.

Figure 1 is a view of the dial or face of one form of device embodying the present invention and diagrammatically showing the same attached to a road wheel of an automobile shown in reduced size.

Figure 2 is a sectional view of the device wherein the rotating member is cone shaped.

Figure 3 is a sectional view of the device wherein the rotating member is a cylindrical drum.

Heretofore in the art of speedometers there have been four general types. The magnetic type which depends upon Focult currents tending to drag a magnetized member with a rotating drum or disk the centrifugal type wherein weights tend to move outwardly from the axis of rotation; the electrical type wherein a current is generated in proportion to the speed of rotation; and the friction type wherein rotating parts shall be rotated in a fluid, for example air, which by friction tends to drag other parts that are attached to indicating means.

There is one serious difficulty with each of the foregoing mentioned types of speed measuring devices, which difficulty is the fact that the indication of the speed always lags behind the actual speed of the rotating member. Where these devices are utilized in an automobile, the machine may be accelerated to thirty miles an hour and when the actual speed of the machine is thirty miles the indicator will be gradually moving up to that number on the scale. On the other hand, if the machine is suddenly stopped the indicator may indicate a speed some period of time after the parts have actually stopped moving. This is due to the fact that in each of the known types of speed measures there is an element of inertia either due to mass or due to accumulation of force necessary to produce the indication. A further difficulty with the foregoing type of devices is that the mountings are very delicate and any disturbance which changes the relative position of the parts will completely destroy accuracy of the instrument.

The present invention overcomes the difficulties of the known art by providing a speedometer or tachometer wherein a speed measure is indicated directly from a single rotating part due to optical means. One method of securing this result is obtained by optical system based on the reluctance of the eye, or the persistence of vision. It is a well known fact that certain colors when moved past a point of vision at a speed greater than the reluctance of the eye, or the persistence of vision, will cause an apparent change of color to take place. If the colors are chosen with reference to certain light wave lengths, an appearance of white will be produced. This effect may be obtained by the utilization in proper relations of the primary colors red, green, and violet or any combination of complemental colors.

One specific way of carrying out the present invention is by providing a rotating drum or disk with a surface spotted with a number of color value spots so arranged that these color spots will pass the point of sight at a speed greater than the persistence of vision and sufficient to cause blending of the colors in the zone for the lowest speed to be indicated, but not sufficient to blend the colors in the zones to indicate any higher speed until the device is rotated at a speed at least as great as that corresponding to such higher speed indicating zone. For example, a cylindrical drum may be arranged beneath the window comprising a slot in the casing extending over the drum, and the drum may be provided with bands of color. The first band indicating a speed of say five miles an hour, may have one hundred eighty color stripes or bars thereon comprising the three primary colors arranged in successive order. In other words there will be sixty stripes or bars of each color with the colors in alternation. If the drum is rotated at a rate sufficient to carry the proper number of these color stripes past the window per second, this zone or band will appear white.

The next band indicating ten miles per hour may have the ninety color stripes, that is, thirty of each primary color. This band when the device is rotating at the five mile speed, will appear a muddy color and will not be white because the colors are not passing with sufficient rapidity necessary to produce the white color. The next band indicating the fifteen mile per hour speed may have sixty color stripes and will appear darker than the ten mile band, etc. If the speed of the drum now be doubled then both the five mile and the ten mile bands would be white and will indicate the machine moving at a ten mile speed, while all bands or zones above the ten mile zone will be colored. It thus will be seen that the zones progressively turn white as the speed of rotation is increased, so that by associating the zones with a suitable scale the speed may be read directly on the scale.

It is not necessary to utilize white light as a basis because other blended colors may be utilized although white light is preferable. Where white is the basis it is desirable that the window frame through which the zones are read, shall be black or some contrasting color. Where the basic blended color other than white is chosen then it may be desirable to have the window frame of the same color as the basic color so that the contrast will be greatest when the blend is not complete. It is also unnecessary to utilize stripes or bars of color because blending may be obtained by mixtures of colors or by colored spots arranged in many geometrical forms other than bars. Where a disk or cone is utilized the arrangement of color spots over the disk or cone need not be as varied in length or arrangement as where a cylindrical drum is used because, the largest portion of the periphery of the disk or cone will move past the window at a much greater speed than will the hub of the disk or point of the cone and in view of the fact that the indication is directly due to speed, the effect is therefore obtained without such variation in size or arrangement of the color spots as is necessary on a cylindrical drum. Where one band or zone—such as a five mile per hour zone—is taken as a standard and other bands or zones are based thereon it is possible that as to certain of the color bands the bars of colors will as a matter of numbers, be incommensurate with the bars on the basic band, providing the same colors are adhered to for each band. Where this occurs the color spots in the incommensurate band may be changed, or blended from the colors on the other bands, in such manner as to produce the desired effect on this particular band when the disk or drum is rotated at the speed at which the band is required to blend. It is well recognized that the appearance of white may be obtained by the blending of two or more complemental colors (such as orange-red and violet-green) so that the number of different color spots may be chosen to make any particular band uniform as to all parts of its surface irrespective of the incommensurate feature specified.

Referring now to the drawings and more specifically to Figure 2 which indicates one embodiment of the invention, a housing 1 protects a frame 2 which may be secured to the housing by machine screws 4. This frame 2 carries a conical drum 5 which is securely mounted upon a shaft 6 that is journaled in the frame 2. The shaft 6 extends through a boss 7 in the housing 1 and is connected to a flexible shaft 8 that may lead to a pinion 9 in mesh with a driving gear 10 that is mounted in the usual manner on an automobile road wheel 11, or the like, so that the rotation of the road wheel, or the like, directly rotates the conical drum 5.

This conical drum 5 is provided with a plurality of bands or zones 12 of color. Each zone as shown is made up of stripes or bars of complemental colors and the zone at the base of the cone comprises the largest number of such bars which are of the shortest length. Where the rotating member is a cylinder the other zones may represent multiples of the first zone and in which case the length of the color bars in such other zones will also be multiples of the length of the bars in the basic zone. If the rotating member is a disk or cone the zones are arranged to cause the required number of colors to pass a given point at a predetermined speed of rotation. A face plate 14 is supported by the housing 1 and is provided with a window 15 which exposes a portion of the drum so that the bands or zones may be observed as the drum rotates. A scale 16 is provided adjacent the window and is arranged in reference to the zones on the drum so that as the zones change color, or turn white, the speed may be read directly on the scale. It is preferable that the frame of the window 15 shall be a contrasting color to the blend and where white is the blend color then it is preferred that the frame shall be black, or white. The black will contrast with the blended bands, and if white is used it will contrast with the non-blended bands.

Figure 3 illustrates a construction wherein the revolving member comprises a cylindrical drum 17 that is journaled directly in the casing 1 and on this drum the color bars are of the proper proportional length.

In Figure 1 the parts are shown diagrammatically as to the road wheel connections therefore for the purposes of illustration the road wheel is indicated as being stationary. The instrument however indicates, merely for purposes of illustration, a speed of thirty miles per hour, which obviously would require the road wheel to be moving at that rate.

From the foregoing it will appear that the speed is dependent upon the rotation of the drum which is directly geared to the driving member so that the correct speed is at all times directly indicated. Furthermore, it will be noted that there are no adjustments to be made when the parts are once assembled and connected, so that the instrument does not become inaccurate through age or use, and because of the single moving part the device is exceedingly economical to manufacture.

Having thus described my invention, what I claim is:

1. A speed indicator comprising a frame, a colored rotative means mounted to rotate on said frame, a rotatable shaft by which said means may be rotated, the colors on said means being complemental colors and arranged to blend due to persistence of vision and to appear white when said means is rotated to greater than a predetermined speed of rotation, said colors being arranged in bands with the cumulative color values in the blends being so proportioned that the bands progressively appear to turn white as the speed of said means is increased, face plate provided with a window to expose a part of said member, and a scale associated with said window to facilitate direct reading of the indicator.

2. A speed indicator comprising a frame, a colored rotative means associated with said frame, a rotatable shaft by which said means may be rotated, the colors on said means being complemental colors and arranged to blend due to persistence of vision and to appear white when said means is rotated at greater than a predetermined speed of rotation, said colors being arranged in bands with the cumulative color values in the bands being so proportioned that the bands progressively appear to turn white as the speed of said means is increased, a face plate provided with a window to expose a part of said member.

3. A speed indicator comprising a frame, and a colored rotative means mounted to rotate on said frame, and means whereby said rotative means may be rotated, the colors on said means being complemental colors and arranged to blend due to persistence of vision and to appear white when said means is rotated at greater than a predetermined speed of rotation, said colors being arranged in bands with the cumulative color values in the bands being so proportioned that the bands progressively appear to turn white as the speed of said means is increased.

4. A speed indicator comprising a frame, and a colored rotative means associated with said frame, means whereby said rotating means may be rotated, the colors on said means being complemental colors and arranged progressively on said means to blend due to persistence of vision and in such manner that a portion of said means will appear white when said means is rotated at a greater speed than a predetermined speed of rotation.

5. A speed indicator comprising a frame, and a colored rotative means mounted to rotate on said frame, and means whereby said rotative means may be rotated the colors on said means being arranged to blend due to persistence of vision to produce a predetermined optical effect when said means is rotated at greater than a predetermined speed of rotation.

6. A speedometer comprising colored rotatable means with the colors arranged thereon to appear as a characteristic blend when said means is rotated at a predetermined speed and to cause said blend to move from one part of said means toward another part thereof when the speed of rotation of said means is increased, and devices whereby said means may be rotated.

7. A speedometer comprising a colored rotatable drum with the colors arranged thereon in progressive relation to appear as a characteristic blend upon a portion of said drum when said drum is rotated at a predetermined speed, and devices whereby said drum may be rotated.

8. A speedometer comprising a colored rotatable drum with the colors arranged thereon to appear as a characteristic blend when the said drum is rotated at a predetermined speed, devices whereby said drum may be rotated, and a face plate provided with a window for exposing a portion of said drum to view.

9. A speedometer comprising a colored rotatable drum with the colors arranged thereon to appear as a characteristic blend when said drum is rotated at a predetermined speed, devices whereby said drum may be rotated, and a screen provided with a window for exposing a portion of said drum to view, the frame of said window being colored to contrast with the said blend of the colors on the drum when said drum is rotated.

10. A speedometer comprising a rotatable drum, colored bands thereon, each band comprising complemental color stripes arranged in alternation, and a shaft whereby said drum may be rotated.

11. A speedometer comprising a rotatable drum, colored bands thereon, each band comprising complemental color stripes arranged in alternation, a face plate provided with a window over the drum and at right angles to the surface movement thereof when the drum rotates, and means whereby said drum may be rotated.

12. A speedometer comprising a rotatable drum, colored bands thereon, each band comprising complemental color stripes arranged in alternation, and means whereby said drum may be rotated, the color arrangement of the bands being such as to cause a line of demarcation to travel from one end of the window toward the other end thereof when the drum is rotated within predetermined speed limits.

13. A speedometer comprising a casing provided with a window therein, a colored rotating member adapted to expose a plurality of colored areas beneath said window when said member is rotated to blend a portion of said colors and means whereby said member may be rotated to cause a progressive movement of said blend of colors.

14. The method of indicating speed which method comprises providing a movable member with predetermined colored areas adapted to produce a predetermined color blend when the member is rotated at a predetermined speed, and then rotating the said member.

15. The method of indicating speeds of a moving object, which method comprises providing areas of predetermined optical effects on a movable member in such manner that when said member is moved at a predetermined speed past a predetermined line the persistent cumulative visual effect of said areas causes a zone of optical demarcation to appear on said member, which zone changes as the speed of the said member changes; and then causing said member to move at a speed proportionate to the movement of the said moving object.

16. The method of indicating speeds of a rotating part, which method comprises providing areas of predetermined optical effects on a rotative member in such manner that when said member is rotated at a predetermined speed the persistent cumulative visual effect of said areas causes a zone of color blend to appear on said member, which zone changes as the speed of rotation of said member changes; and then causing said member to rotate at a rate proportionate to the speed of the rotating part.

17. The method of indicating speeds of a rotating part, which method comprises providing complemental colored areas on a rotative member in such manner as to cause a white zone to appear on said member when said member is rotated at a predetermined speed and to cause said zone to change in width as the speed of said member changes; and then rotating said member.

18. The method of indicating speeds of a rotating part, which method comprises providing bands of complemental colored bars on a rotative member in such manner as to cause a white zone to appear when said member is rotated at a predetermined speed; rotating the said member; and arranging a scale at right angles to the movement of the said bands.

19. A device for indicating speeds comprising rotating means having a plurality of colors adapted to blend when predetermined speed limits are reached, a scale associated with said means, and devices whereby said means may be rotated.

20. A device for indicating speeds, said device comprising colored rotating means adapted to successively present different colors to a point of vision, said colors being arranged in groups having different cumulative values whereby certain of the groups present a predetermined appearance for predetermined speeds and others of the group present a different appearance for the same speed, and means for rotating the said colored rotating means.

GEORGE RAMSEY.